United States Patent
Smith, Jr.

(10) Patent No.: US 7,360,350 B1
(45) Date of Patent: Apr. 22, 2008

(54) WEED TRIMMER CARRIAGE

(76) Inventor: Mel Smith, Jr., 1306 Martin Luther King Dr., Wynne, AR (US) 72396

( * ) Notice: Subject to any disclaimer, the term of this patent is extended or adjusted under 35 U.S.C. 154(b) by 0 days.

(21) Appl. No.: 11/495,343

(22) Filed: Jul. 28, 2006

(51) Int. Cl.
*A01D 34/00* (2006.01)
(52) U.S. Cl. .................................................. 56/12.7
(58) Field of Classification Search ............ 56/12.7, 56/17.1, 16.7, 17.5; 30/273, 276; 172/17, 172/15; 24/273
See application file for complete search history.

(56) References Cited

U.S. PATENT DOCUMENTS

| | | | | |
|---|---|---|---|---|
| 4,442,659 A | * | 4/1984 | Enbusk | 56/12.7 |
| 4,531,350 A | * | 7/1985 | Huthmacher | 56/17.5 |
| 4,829,755 A | * | 5/1989 | Nance | 56/17.1 |
| 4,922,694 A | * | 5/1990 | Emoto | 56/16.7 |
| 5,092,112 A | * | 3/1992 | Buckendorf, Jr. | 56/17.5 |
| 5,222,750 A | * | 6/1993 | Ellis | 280/47.33 |
| 5,836,142 A | * | 11/1998 | Maxwell | 56/12.1 |
| 5,970,692 A | * | 10/1999 | Foster | 56/12.1 |
| 5,970,694 A | * | 10/1999 | Knox, Jr. | 56/16.7 |
| 6,085,503 A | * | 7/2000 | Hutchinson | 56/12.7 |
| 6,363,699 B1 | * | 4/2002 | Wang | 56/12.7 |
| 6,986,238 B1 | * | 1/2006 | Bloodworth | 56/12.7 |
| 7,036,297 B2 | * | 5/2006 | Popp | 56/12.7 |
| 2003/0221400 A1 | * | 12/2003 | Gallentine | 56/12.7 |

* cited by examiner

*Primary Examiner*—Árpád Fábián Kovács

(57) ABSTRACT

A weed trimmer carriage is disclosed. An illustrative embodiment of the weed trimmer carriage includes an elongated crossbar, at least one wheel carried by the crossbar and a clamp carried by the crossbar. A weed trimming apparatus is also disclosed.

8 Claims, 5 Drawing Sheets

WEED TRIMMER CARRIAGE

FIELD

The present invention relates to weed trimmers. More particularly, the present invention relates to a weed trimmer carriage to which a weed trimmer can be attached to render the weed trimmer mobile on a surface.

BACKGROUND

Weed trimmers are commonly used to cut grass or weeds in areas of a lawn which are inaccessible to a lawnmower. A typical conventional weed trimmer includes an elongated shaft to which is attached a rotatable trimmer head. A trigger-operated motor on the shaft rotates the trimmer head, from which extends a flexible nylon trimmer line. Accordingly, during operation of the motor, the trimmer head rotates and the trimmer line cuts weeds, grass and other vegetation. The operator of the weed trimmer typically grips a handle provided on the shaft to hold the trimmer head over the weeds, grass or other vegetation being cut. This, however, results in fatigue to the operator, particularly during prolonged periods of operating the weed trimmer.

SUMMARY

The present invention is generally directed to a weed trimmer carriage. An illustrative embodiment of the weed trimmer carriage includes an elongated crossbar, at least one wheel carried by the crossbar and a clamp carried by the crossbar.

The present invention is also generally directed to a weed trimming apparatus. An illustrative embodiment of the weed trimming apparatus includes a weed trimmer carriage having an elongated crossbar, at least one wheel carried by the crossbar and a clamp carried by the crossbar. A weed trimmer is carried by the clamp.

BRIEF DESCRIPTION OF THE DRAWINGS

The invention will now be described, by way of example, with reference to the accompanying drawings, in which.

DETAILED DESCRIPTION

Figure 1:
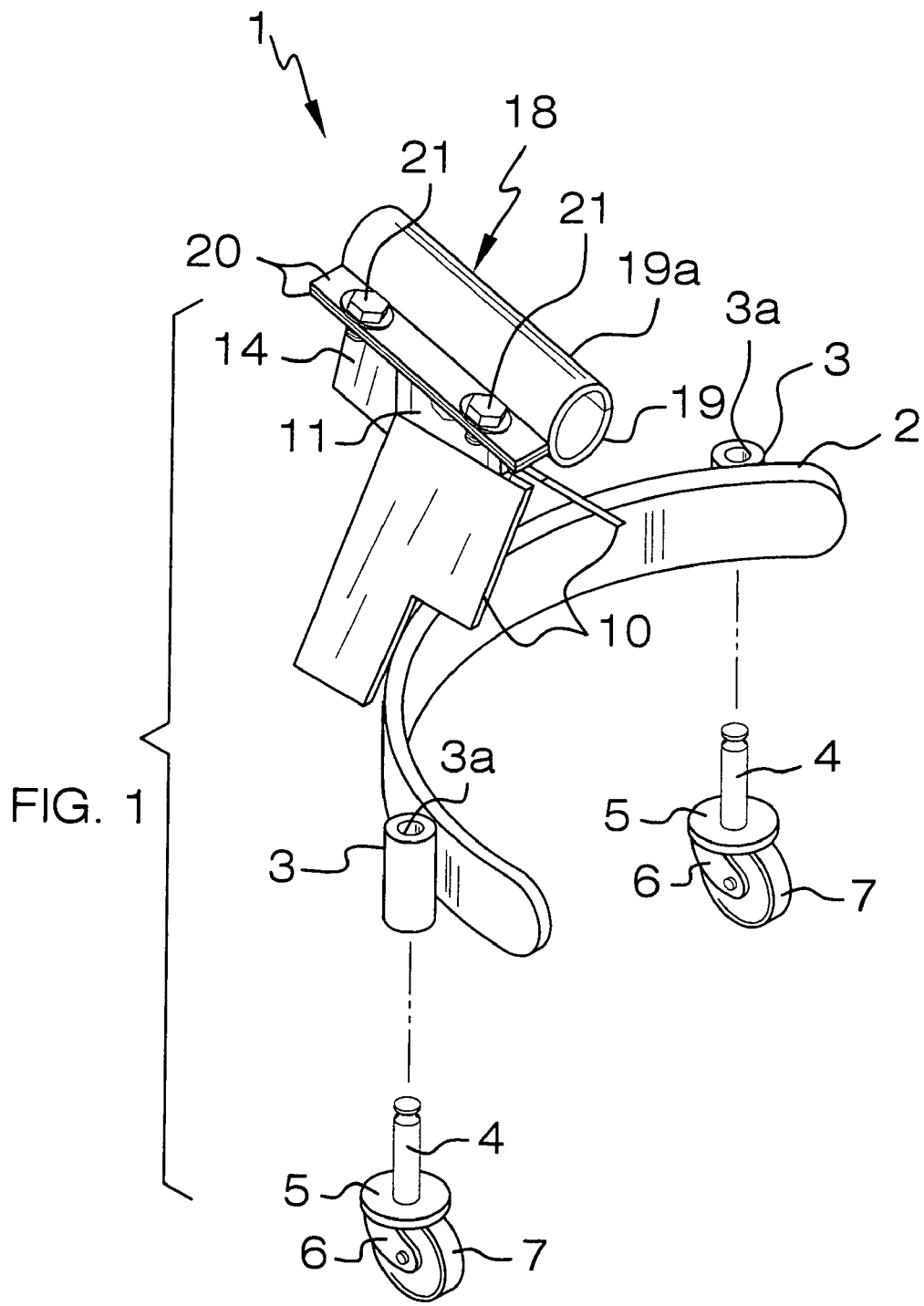
FIG. 1 is an exploded, perspective view of an illustrative embodiment of the weed trimmer carriage.
Figure 3:
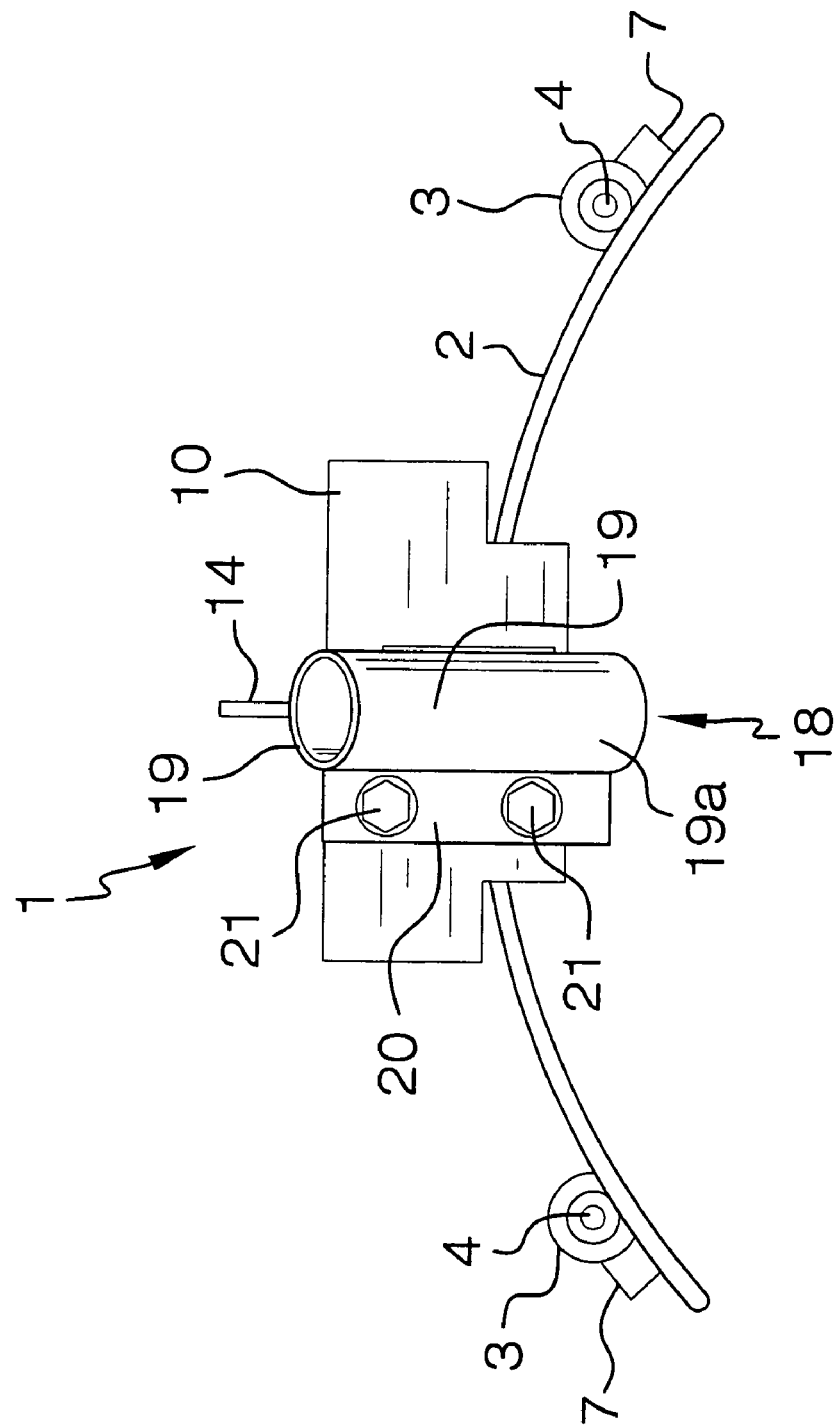
FIG. 3 is a top view of an illustrative embodiment of the weed trimmer carriage.
Figure 4:
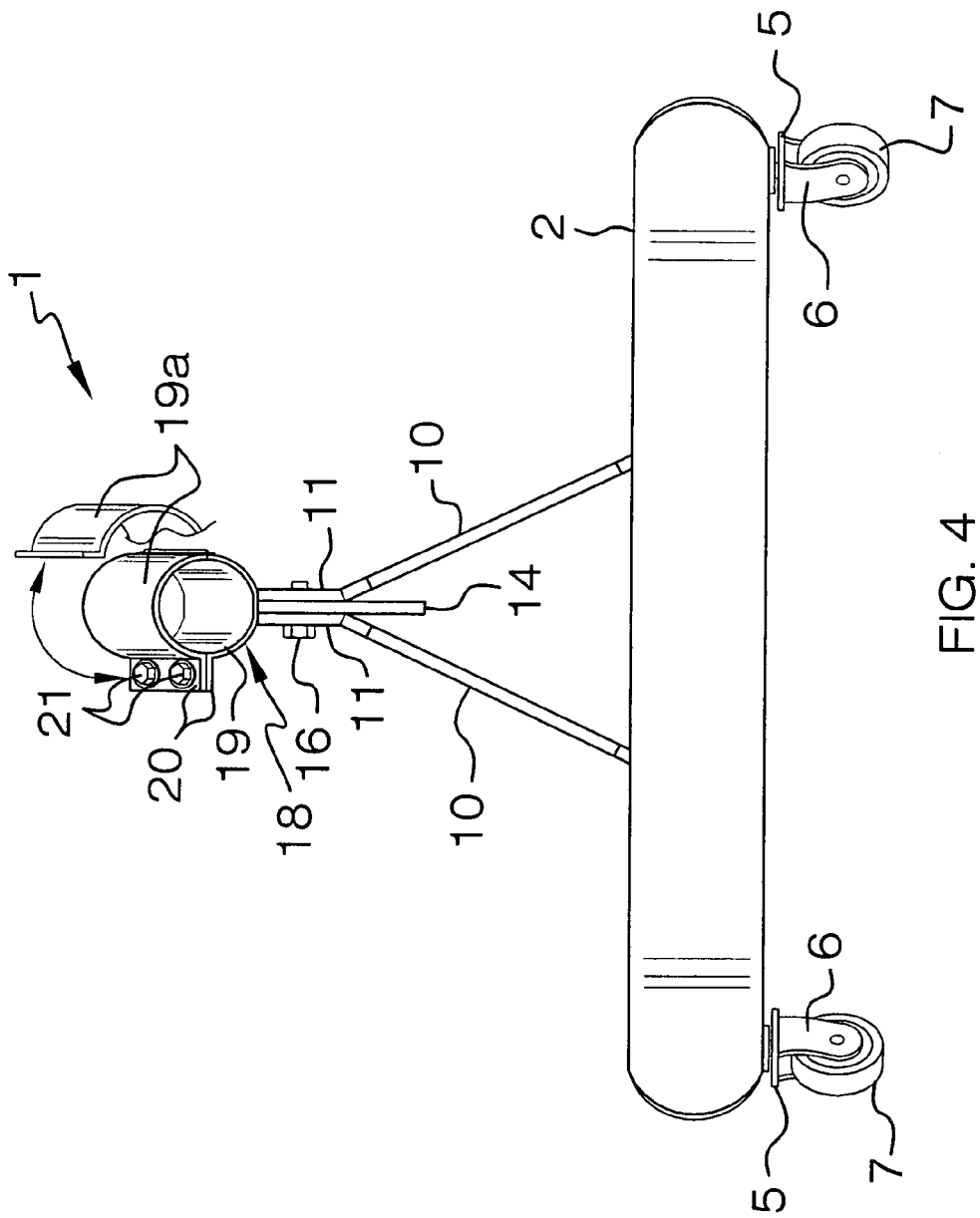
FIG. 4 is a front view of an illustrative embodiment of the weed trimmer carriage.

Referring initially to FIGS. 1, 3 and 4 of drawings, an illustrative embodiment of the weed trimmer carriage is generally indicated by reference numeral 1. The weed trimmer carriage 1 includes a crossbar 2 which may have a generally elongated, curved shape. At least one wheel 7 is provided on the crossbar 2 to impart mobility to the crossbar 2. A pair of wheels 7 may be provided on the crossbar 2 in spaced-apart relationship with respect to each other and may be attached to the crossbar 2 using any of a variety of techniques known to those skilled in the art. For example, as shown in FIG. 1, a pair of wheel receptacles 3, each having a rod opening 3a, may be provided on the crossbar 2. A wheel rod 4 extends through the rod opening 3a, and a wheel disk 5 is provided on the wheel rod 4. A wheel frame 6 extends from the wheel disk 5, and the wheel 7 is rotatably mounted in the wheel frame 6. It is to be understood that alternative structures or techniques known to those skilled in the art may be used to attach the wheel or wheels 7 to the crossbar 2.

A clamp 18, the purpose of which will be hereinafter described, is provided on the crossbar 2 using any of a variety of techniques known to those skilled in the art. For example, a pair of clamp braces 10 may extend from the crossbar 2. The clamp braces 10 may extend toward each other in a tapered or pitched configuration. As shown in FIG. 4, a pair of brace flanges 11 extends from the clamp braces 10, respectively, in spaced-apart relationship with respect to each other. A clamp plate 14 is provided between the brace flanges 11 of the respective clamp braces 10. A clamp adjustment fastener 16 extends through registering openings (not shown) provided in the brace flanges 11 and clamp plate 14 and may be selectively tightened and loosened to facilitate re-positioning of the clamp plate 14, for purposes which will be hereinafter described.

The clamp 18 includes a base clamp section 19 which is attached to the clamp plate 14 and a pivoting clamp section 19a which is pivotally attached to the base clamp section 19. The base clamp section 19 and the pivoting clamp section 19a may each have a generally elongated, curved shape. Clamp flanges 20 typically extend from the respective base clamp section 19 and pivoting clamp section 19a. Clamp fasteners 21 extend through respective fastener openings (not shown) provided in the clamp flanges 20 to facilitate fastening of the pivoting clamp section 19a to the base clamp section 19 in the closed configuration of the clamp 18. The axial position of the clamp 18 may be adjusted, as deemed necessary, by loosening the clamp adjustment fastener 16; pivoting the clamp plate 14 between the brace flanges 11; and re-tightening the clamp adjustment fastener 16.

Figure 2:
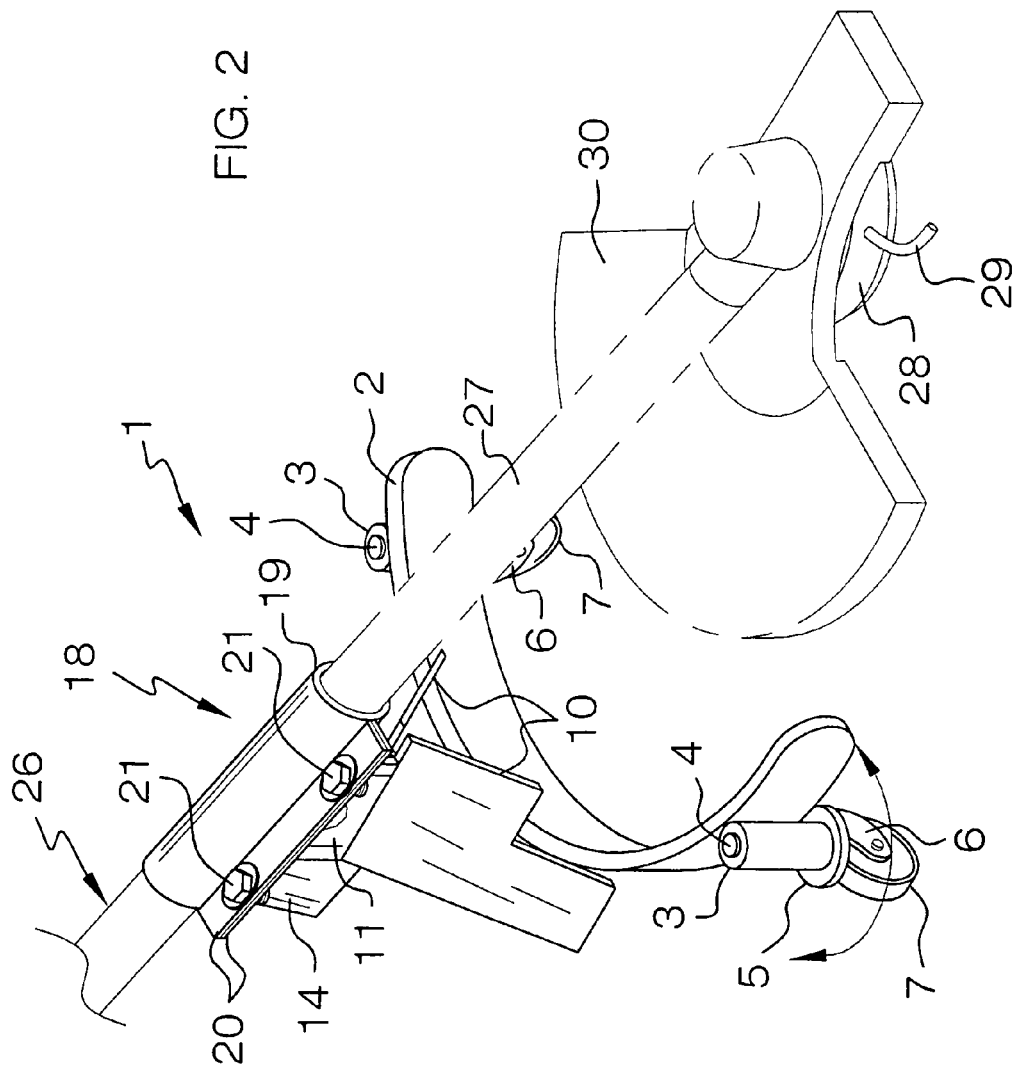
FIG. 2 is a perspective view of an illustrative embodiment of the weed trimmer carriage, with a weed trimmer (partially in section) attached to the weed trimmer carriage.
Figure 5:
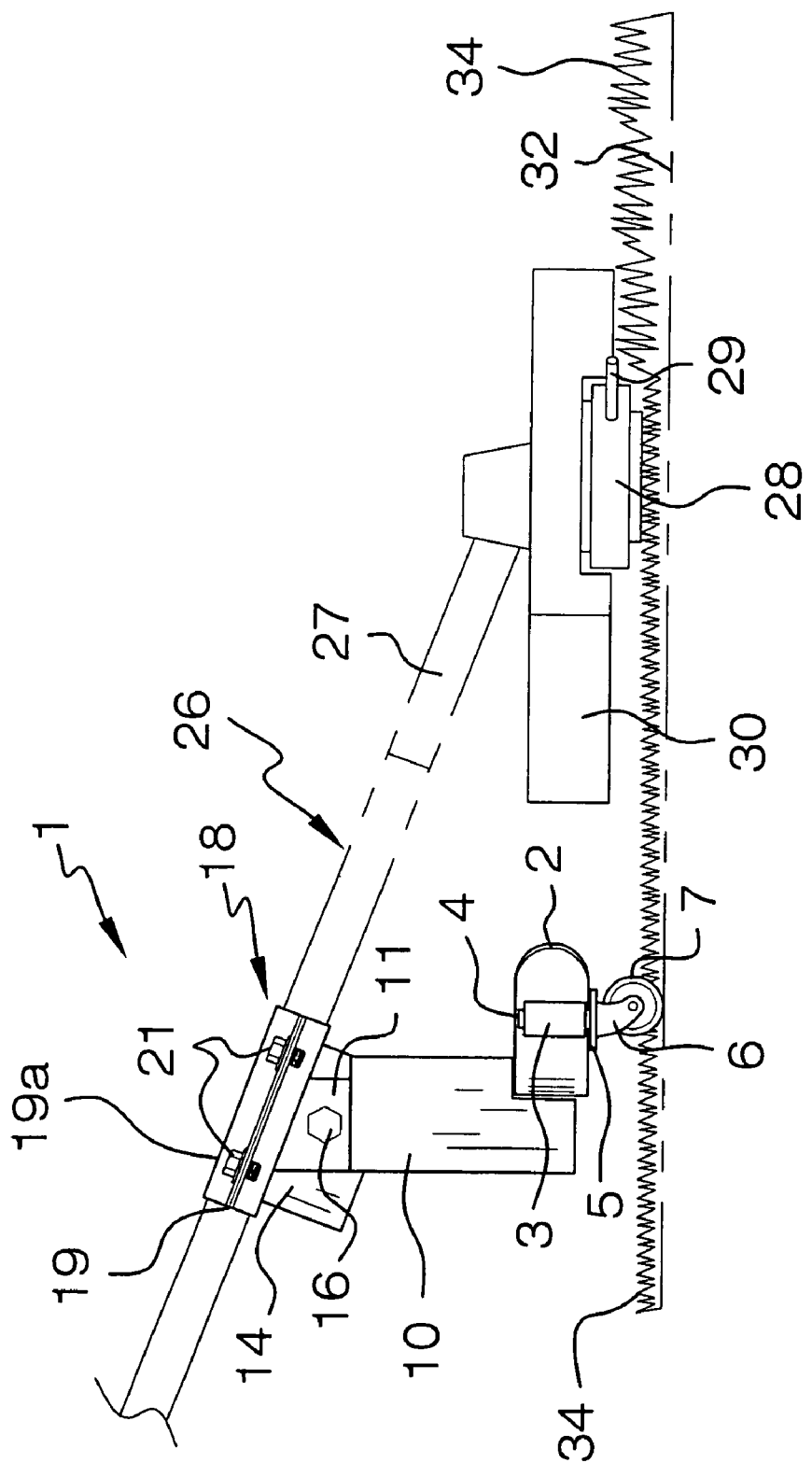
FIG. 5 is a side view of an illustrative embodiment of the weed trimmer carriage, with a weed trimmer (partially in section) attached to the weed trimmer carriage and more particularly illustrating cutting of grass using the weed trimmer in typical operation of the weed trimmer carriage.

Referring next to FIGS. 2 and 5 of the drawings, in typical use, a weed trimmer 26 is attached to the weed trimmer carriage 1 to facilitate support and transport of the weed trimmer 26 on the ground 32 as the weed trimmer 26 is operated to cut grass 34, as shown in FIG. 5. The weed trimmer 26 may be conventional and typically includes an elongated shaft 27. A rotating trimmer head 28 is provided on one end of the shaft 27. A nylon trimmer line 29 is extendable from the trimmer head 28. A trimmer guard 30 is provided on the shaft 27 and shields the trimmer head 28. A motor (not shown) provided on the shaft 27 rotates the trimmer head 28 typically responsive to operation of a trigger (not shown) provided on the shaft 27.

As shown in FIG. 2, the weed trimmer 26 is attached to the weed trimmer carriage 1 typically by fastening the shaft 27 of the weed trimmer 26 in the clamp 18 of the weed trimmer carriage 1. The wheel or wheels 7 of the weed trimmer carriage 1 rest on the ground 32. Accordingly, the clamp 18 supports the shaft 27 at a sloped angle in such a manner that the trimmer head 28 is supported just above the ground 32. The height of the trimmer head 28 above the ground 32 can be adjusted, as deemed necessary, by pivoting the clamp 18 with respect to the brace flanges 11 of the respective clamp braces 10. This is accomplished by loosening the clamp adjustment fastener 16 to facilitate adjustment and re-tightening the clamp adjustment fastener 16 after adjustment. Throughout operation of the weed trimmer 26, the trimmer head 28 and trimmer line 29 are rotated to cut grass 34 as the wheel or wheels 7 of the weed trimmer carriage 1 is/are rolled along the ground 32. This prevents fatigue of the operator since it is not necessary for the operator to hold the shaft 27 with the trimmer head 28 above the ground 32.

While the preferred embodiments of the invention have been described above, it will be recognized and understood that various modifications can be made in the invention and the appended claims are intended to cover all such modifications which may fall within the spirit and scope of the invention.

What is claimed is:

1. A weed trimmer carriage, comprising:
   an elongated crossbar of curved configuration;
   at least one wheel carried by said crossbar;
   a pair of clamp braces carried by said crossbar;
   a clamp plate adjustably carried by said pair of clamp braces;
   a clamp carried by said clamp plate; said clamp comprises a base clamp section carried by said clamp plate and a pivoting clamp section pivotally carried by said base clamp section.

2. The weed trimmer carriage of claim 1 further comprising a pair of clamp flanges carried by said base clamp section and said pivoting clamp section, respectively, and at least one clamp fastener extending through said pair of clamp flanges.

3. The weed trimmer carriage of claim 1 wherein said base clamp section and said pivoting clamp section each has a generally elongated, curved shape.

4. The weed trimmer carriage of claim 1 wherein said at least one wheel comprises a pair of spaced-apart wheels.

5. The weed trimmer carriage of claim 1 further comprising at least one wheel receptacle carried by said crossbar, a rod opening extending through said at least one wheel receptacle, a wheel rod extending through said rod opening, a wheel disk carried by said wheel rod and a wheel frame carried by said wheel disk, and wherein said wheel is rotatably carried by said wheel frame.

6. The weed trimmer carriage of claim 1 wherein said clamp is pivotally carried by said crossbar.

7. A weed trimming apparatus, comprising:
   a weed trimmer carriage having an elongated crossbar of curved configuration, at least one wheel carried by said crossbar and a clamp carried by said crossbar;
   a weed trimmer carried by said clamp; a pair of clamp braces carried by said crossbar and a clamp plate adjustably carried by said pair of clamp braces, and wherein said clamp is carried by said clamp plate; said clamp comprises a base clamp section carried by said clamp plate and a pivoting clamp section pivotally carried by said base clamp section.

8. The apparatus of claim 7 further comprising a pair of clamp flanges carried by said base clamp section and said pivoting clamp section, respectively, and at least one clamp fastener extending through said pair of clamp flanges.

* * * * *